(12) United States Patent
Basavanna et al.

(10) Patent No.: US 9,419,930 B2
(45) Date of Patent: Aug. 16, 2016

(54) MANAGEMENT OF CONNECTIONS IN A MESSAGING ENVIRONMENT

(71) Applicant: INTERNATIONAL BUSINESS MACHINES CORPORATION, Armonk, NY (US)

(72) Inventors: Sharath C. Basavanna, Bangalore (IN); Chethan Bhat, Udupi (IN); Lohitashwa Thyagaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 13/929,929

(22) Filed: Jun. 28, 2013

(65) Prior Publication Data
US 2015/0006643 A1   Jan. 1, 2015

(51) Int. Cl.
*G06F 15/16* (2006.01)
*H04L 12/58* (2006.01)

(52) U.S. Cl.
CPC ............... *H04L 51/22* (2013.01); *H04L 51/14* (2013.01)

(58) Field of Classification Search
CPC .................................. H04L 51/14; H04L 51/22
USPC ................................................. 709/206, 207
See application file for complete search history.

(56) References Cited

U.S. PATENT DOCUMENTS

| | | | | |
|---|---|---|---|---|
| 6,236,365 B1 * | 5/2001 | LeBlanc | ............... | G01C 21/206 342/450 |
| 6,523,027 B1 * | 2/2003 | Underwood | ............ | G06F 9/465 |
| 6,643,362 B2 * | 11/2003 | Hogan | ................ | H04M 3/4228 379/114.14 |
| 7,117,246 B2 * | 10/2006 | Christenson | ............ | H04L 51/30 707/999.01 |
| 7,145,898 B1 * | 12/2006 | Elliott | ..................... | H04L 12/66 370/352 |
| 7,249,229 B2 * | 7/2007 | Ogasawara | ........... | G06F 3/0613 709/206 |
| 7,519,669 B2 | 4/2009 | Nikolov | | |
| 7,594,236 B2 * | 9/2009 | Jiang | ....................... | G06F 9/542 719/313 |
| 7,657,597 B2 * | 2/2010 | Arora | ...................... | H04L 51/04 707/830 |
| 7,673,072 B2 * | 3/2010 | Boucher | .................. | H04L 69/16 370/230 |
| 7,680,879 B2 * | 3/2010 | Battat | ............... | G06F 17/30371 709/203 |
| 7,870,260 B2 * | 1/2011 | McIsaac | .................. | H04L 51/12 370/351 |
| 7,996,562 B2 | 8/2011 | Holdsworth | | |
| 8,082,307 B2 | 12/2011 | Wallis et al. | | |
| 8,301,718 B2 * | 10/2012 | Macken | .................. | G06F 9/542 709/201 |
| 8,549,180 B2 * | 10/2013 | Critchley | ................ | H04L 12/42 709/251 |
| 8,885,813 B2 * | 11/2014 | Vendrow | ............. | H04M 3/4234 379/266.01 |
| 8,996,662 B2 * | 3/2015 | Butler | ..................... | H04L 67/28 709/219 |
| 9,069,633 B2 * | 6/2015 | Manula | .................... | G06F 9/546 |
| 2006/0117041 A1 | 6/2006 | Ayres et al. | | |

(Continued)

OTHER PUBLICATIONS

J. Wang et al., "Enhance Resilience and QOS Awareness in Message Oriented Middleware for Mission Critical Applications," Eighth Interanational Conference on Information Technology: New Generations, IEEE Computer Society, 2011, p. 677-682.

(Continued)

*Primary Examiner* — Melvin H Pollack
(74) *Attorney, Agent, or Firm* — Law Office of Jim Boice

(57) ABSTRACT

A method, system, and/or computer program product manages message connections in a computer infrastructure. A processor connects a client to a messaging component over a connection. Identification information of a destination message queue that the client intends to communicate to the messaging component is provided, and a reference of the destination message queue is received. Based on the received reference, a respective messaging component that has the destination message queue localized is identified.

13 Claims, 5 Drawing Sheets

(56) References Cited

U.S. PATENT DOCUMENTS

| | | |
|---|---|---|
| 2008/0313349 A1 | 12/2008 | Nickoll et al. |
| 2009/0217293 A1 | 8/2009 | Wolber et al. |
| 2010/0325219 A1* | 12/2010 | Vasters .................. G06F 9/546 709/206 |
| 2013/0288692 A1* | 10/2013 | Dupray ................. H04W 64/00 455/450 |
| 2014/0047082 A1* | 2/2014 | Brandwine ........... H04L 45/586 709/220 |

OTHER PUBLICATIONS

Y. Liu et al., "Performance Prediction of J2EE Applications Using Messaging Protocols," Springer, Component-Based Software Engineering Lecture Notes in Computer Science, vol. 3489, 2005, pp. 1-16 (Abstract Only).

P. Mell et al., "The NIST Definition of Cloud Computing", National Institute of Standards and Technology, Information Technology Laboratory, Special Publication 800-145, Sep. 2011, pp. 1-7.

* cited by examiner

MANAGEMENT OF CONNECTIONS IN A MESSAGING ENVIRONMENT

BACKGROUND

The present invention relates to messaging environments, and more specifically, to management of connections in a messaging environment.

Messaging is typically a method of communication between software components or applications. A messaging system is a peer-to-peer facility. A messaging client can send messages to, and receive messages from, any other clients. Each client typically connects to a messaging agent that provides facilities for creating, sending, receiving, and reading messages.

SUMMARY

A method, system, and/or computer program product manages message connections in a computer infrastructure. A processor connects a client to a messaging component over a connection. Identification information of a destination message queue that the client intends to communicate to the messaging component is provided, and a reference of the destination message queue is received. Based on the received reference, a respective messaging component that has the destination message queue localized is identified.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
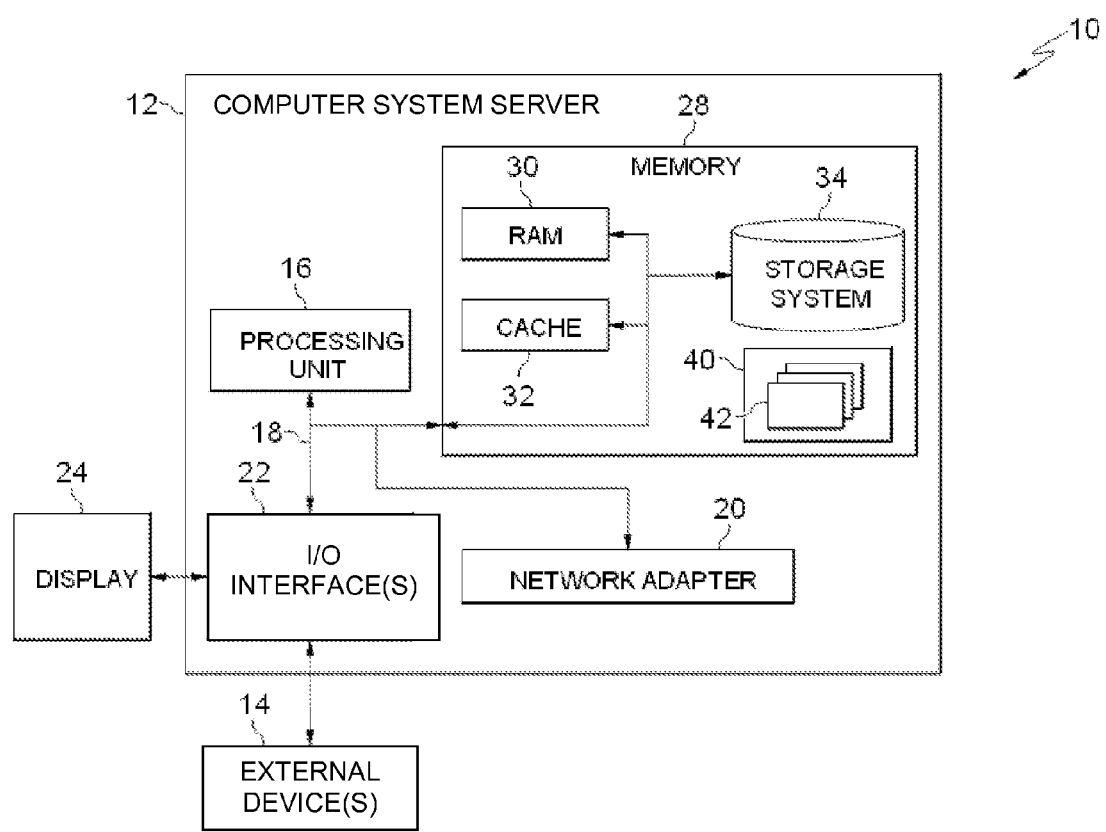
FIG. 1 depicts a cloud computing node according to an embodiment of the present invention.

Messaging enables distributed communication that is loosely coupled. A component sends a message to a destination, and the recipient can retrieve the message from the destination. However, the sender and the receiver do not have to be available at the same time in order to communicate. In fact, the sender does not need to know anything about the receiver; nor does the receiver need to know anything about the sender. The sender and the receiver need to know only what message format and destination to use. In this respect, messaging differs from tightly coupled technologies, such as remote method invocation (RMI), which requires an application to know a remote application's method.

The Java message service (JMS) is a Java API that allows applications to create, send, receive, and read messages. Designed by Sun Microsystems and other partners, the JMS API defines a common set of interfaces and associated semantics that allow programs written in the Java programming language to communicate with other messaging implementations. A typical JMS application may include a JMS provider, one or more JMS clients, messages, one or more administered objects, and one or more native clients. A JMS provider is a messaging system that implements the JMS interfaces and provides administrative and control features. JMS clients are the programs or components, written in the Java programming language, that produce and consume messages. Messages are the objects that communicate information between the JMS clients. Administered objects are pre-configured JMS objects created by an administrator for the use of clients. There are two kinds of administered objects: destinations and connection factories. Native clients are programs that use a messaging product's native client API instead of the JMS API. An application first created before the JMS API became available and subsequently modified is likely to include both JMS and native clients.

Typically, most current implementations of the JMS API provide support for both point-to-point (PTP) and the publish/subscribe (pub/sub) domains. A PTP product or application is built around the concept of message queues, senders, and receivers. Each message is addressed to a specific queue, and receiving clients extract messages from the queue(s) established to hold their messages. Queues retain all messages sent to them until the messages are consumed or until the messages expire. Under a PTP system, each message has only one consumer. A sender and a receiver of a message have no timing dependencies. The receiver can fetch the message whether or not it was running when the client sent the message. The receiver acknowledges the successful processing of a message.

In a publish/subscribe (pub/sub) product or application, clients address messages to a topic. Publishers and subscribers are generally anonymous and may dynamically publish or subscribe to the content hierarchy. The system takes care of distributing the messages arriving from a topic's multiple publishers or its multiple subscribers. Topics retain messages only as long as it takes to distribute them to current subscribers. Under a pub/sub system, each message may have multiple consumers (also referred to as subscribers). Publishers and subscribers have a timing dependency. As a general rule, a client that subscribes to a topic can consume only messages published after the client has created a subscription, and the subscriber must continue to be active in order for the subscriber to consume messages.

In addition, the JMS APT relaxes this timing dependency to some extent by allowing clients to create durable subscriptions. Durable subscriptions can receive messages sent while the subscribers are not active. Durable subscriptions provide the flexibility and reliability of queues but still allow clients to send messages to many recipients.

JMS messages maybe consumed synchronously or asynchronously. Under the synchronous model, a subscriber or a receiver explicitly fetches the message from the destination by calling the "receive" method. The "receive" method can block until a message arrives or can time out if a message does not arrive within a specified time limit. Under the asynchronous model, a client can register a message listener with a consumer. A message listener is similar to an event listener. Whenever a message arrives at the destination, the JMS provider delivers the message by calling the listener's "on Message" method, which acts on the contents of the message.

The parts, destination and connection factories, of a JMS application, are best maintained administratively rather than programmatically. These components are implemented as objects under object-oriented programming environments, particularly referred to as administered objects. The technology underlying these objects is likely to be very different from one implementation of the JMS API to another. Thus, the management of these objects varies from provider to provider.

JMS clients access these objects through interfaces that are portable, so a client application can run with little or no change on more than one implementation of the JMS API. Ordinarily, an administrator configures administered objects in a Java naming and directory interface (JNDI) API namespace, and JMS clients then look them up, using the INDI API. For example, in a J2EE (Java 2 enterprise edition) development environment, an administrator may use a tool called j2eeadmin to perform the administrative tasks.

A connection factory is the object a client uses to create a connection with a message provider (e.g., a JMS provider). A connection factory may be created using the j2eeadmin tool for a PTP and/or a pub/sub domain. A connection factory encapsulates a set of connection configuration parameters that has been defined by an administrator.

A destination is the object a client uses to specify the target of messages it produces and the source of messages it consumes. In a PTP messaging domain, destinations are referred to as queues, while in a pub/sub domain, the destinations are referred to as topics. A JMS application may use multiple queues and topics.

A connection encapsulates a virtual connection with a JMS provider. A connection could represent an open TCP/IP socket between a client and a provider server's daemon. A connection may be used to create one or more sessions. When an application completes, any connections associated with the application have to be closed. Failure to close a connection can cause resources not to be released by the JMS provider. Closing a connection also closes its session and their message producers and message consumers. A session is a single-breaded context for producing and consuming messages. Sessions may be used to create message producers, message consumers, and messages.

A message producer is an object created by a session and is used for sending messages to a destination. A message consumer is an object created by a session and is used to receive messages sent to a destination. A message consumer allows a JMS client to register interest in a destination with a JMS provider. The JMS provider manages the delivery of messages from a destination to the registered consumers of the destination. Once a consumer is created, it becomes active and may be used to receive messages. A consumer may be closed via a "close" method.

In general, to achieve location transparency in a distributed messaging environment, a client may connect to any JMS provider of a system to send messages to a destination or receive messages from a destination. However, such approaches have its disadvantages, such as, increased overhead, increased latency and performance degradation.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to the figures, and particularly to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
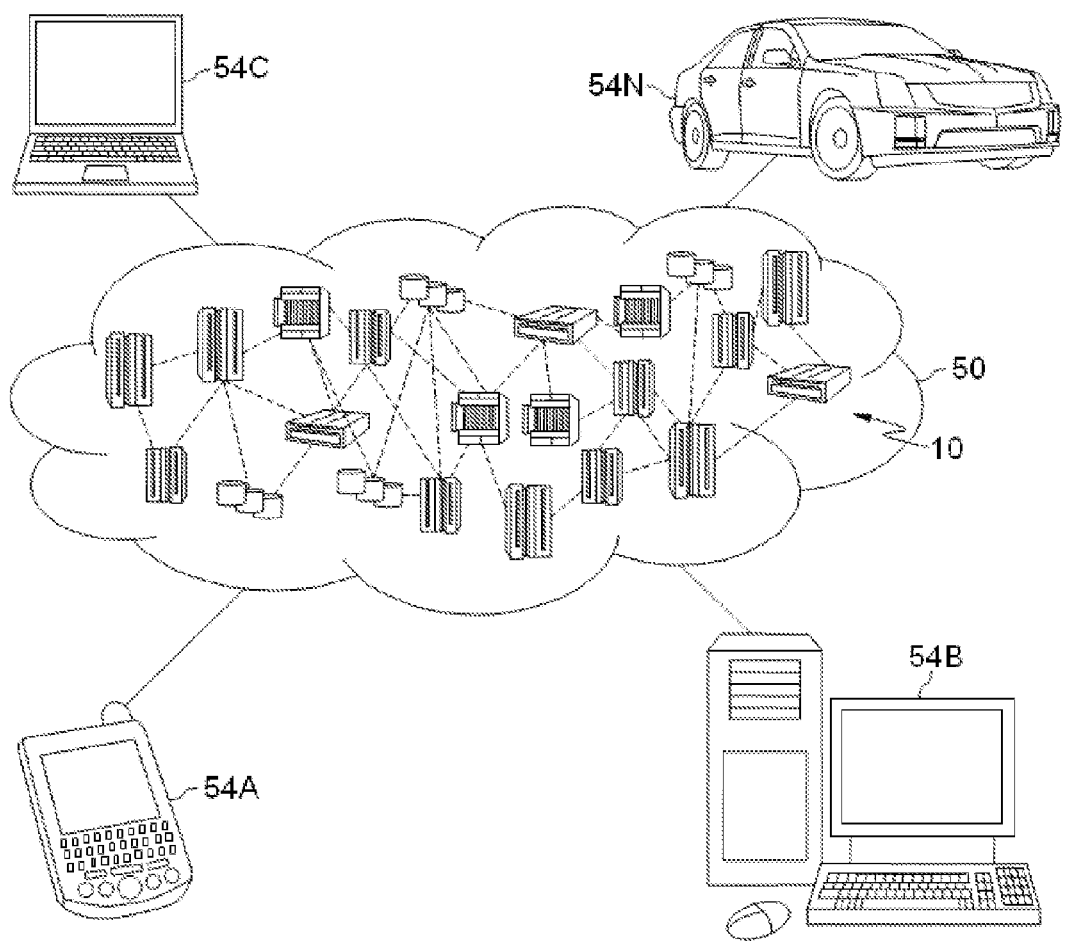
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
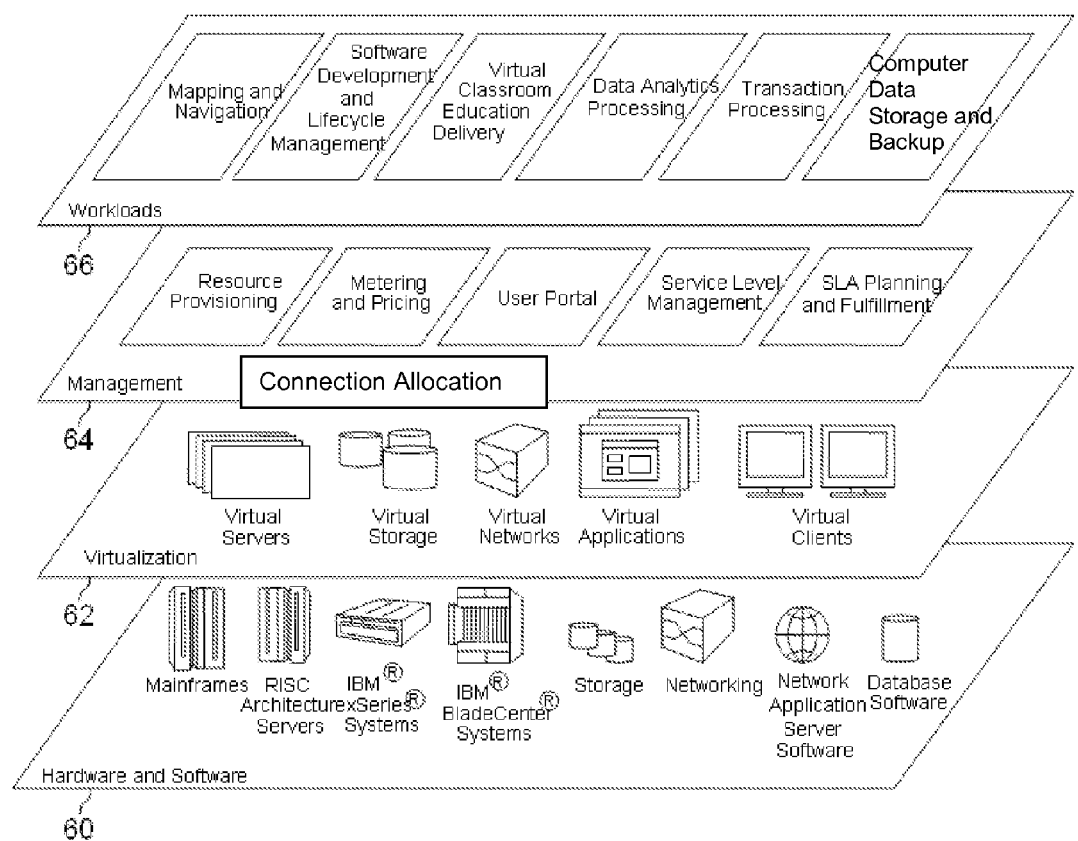
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes computing systems; RISC (Reduced Instruction Set Computer) architecture based servers; blade computing systems; storage devices; networks and networking components. Examples of software components include network client systems, and database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in the management layer 64 is connection allocation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup.

It is understood that all functions of the present invention as described herein typically may be performed by the connection allocation (management layer 64, which can be tangibly as modules of program code 42 of program/utility 40 of FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment known now or later developed.

Figure 4:
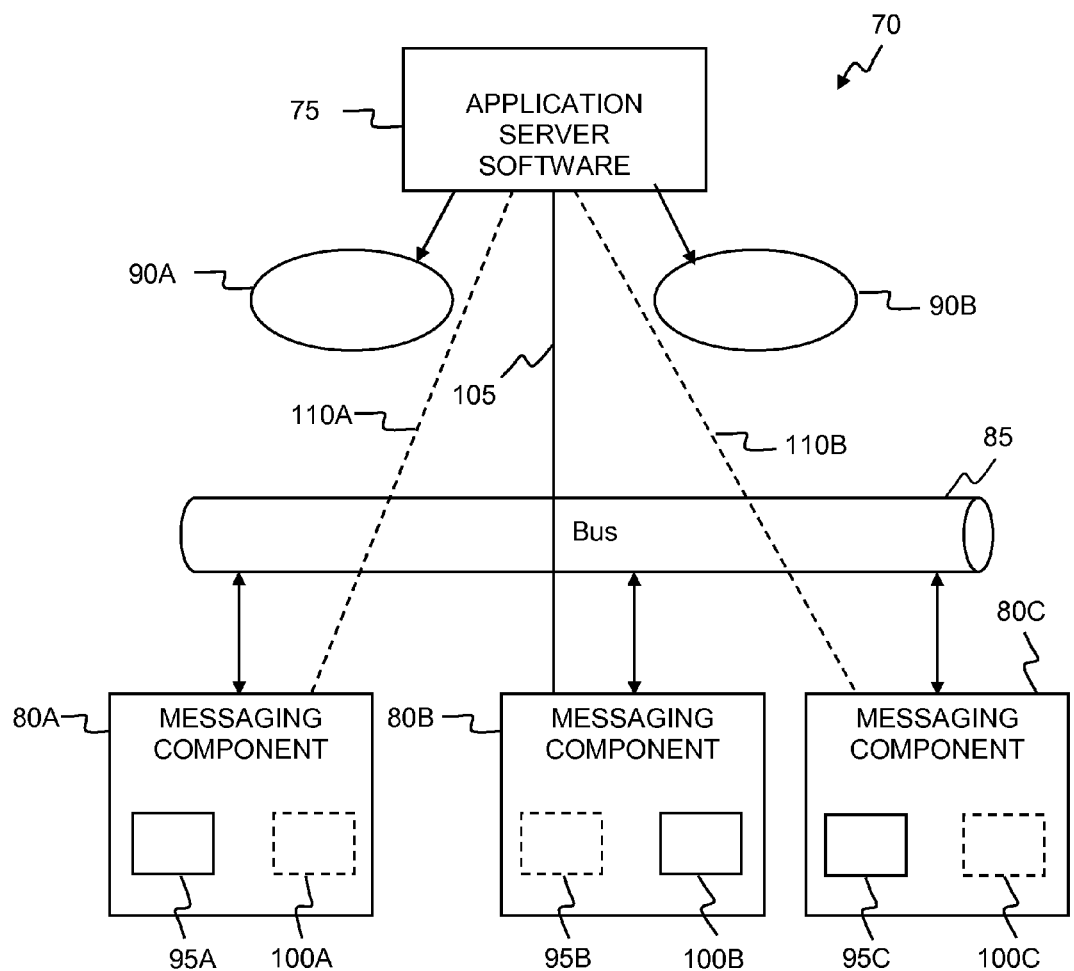
FIG. 4 depicts a messaging environment 70 in accordance with aspects of the present invention.

FIG. 4 depicts a messaging environment 70 in accordance with aspects of the present invention. As shown in the example of FIG. 4, the messaging environment 70 includes a client 75, messaging components 80A, 80B, 80C and a bus 85. The messaging components 80A, 80B, 80C are operatively connected to the bus 85 and provide messaging functions and connection points for the client 75 to connect to the bus 85. The client 75 may produce messages for a destination or consume message from a destination by connecting to the bus 85 at one of the messaging components 80A, 80B, 80C. The destination may be any other designated client in the messaging environment 70. In general, the client 75 may be implemented as a program 40 on the computer system 12 of FIG. 1. The messaging components 80A, 80B, 80C may also be implemented as respective programs 40 on respective computer systems 12 of FIG. 1. The client 75 and the messaging components 80A, 80B, 80C implemented as programs 40 on respective computer systems 12 can implement the functions recited herein as depicted in management layer 64 of FIG. 3. In general, each of the messaging components 80A, 80B, 80C may be implemented on distinct computer systems 12 of FIG. 1. According to one embodiment of the present invention, a client and a messaging component may be implemented as respective programs 40 on the same computer system 12 of FIG. 4. According to another embodiment of the present invention, the client and the messaging component may be implemented on distinct computer systems 12 of FIG. 1.

In the example illustrated in FIG. 4, for exchanging messages, the client 75 connects to the bus 85 at the messaging component 80B over a connection 105. In general, the client 75 may use an API for making the connection 105 to the bus 85. An example of such an API is a Java Message Service (JMS) API. In general, the connection 105 may represent an open TCP/IP socket between the client 75 and the messaging component 80B. According to one embodiment of the present invention, the messaging environment 70 may automatically connect the client 75 to one of the available messaging components 80A, 80B, 80C on the bus 85. According to another embodiment of the present invention, configuration details may be specified to influence the connection process of the client 75 to the bus 85. On the client 75 being connected to the bus 85, the client 75 creates one or more sessions using the connection 105. In general, the session is a single-threaded context for producing and consuming messages. In the depicted example of FIG. 4, the client 75 creates two sessions, depicted in FIG. 4 as session 90A and session 90B. Using one of the sessions, i.e., session 90A, the client 75 creates a message producer for sending messages and using the other session, i.e., session 90B, it creates a message consumer for consuming messages. In general, messages are sent to and received from destinations. A destination is a point of addressability within the bus 85. In general, for point to point messaging capabilities, the destinations are message queues and for publish/subscribe messaging capabilities, the destinations are topics. According to one embodiment of the present invention, in the depicted messaging environment 70 of FIG.

4, each of the messaging components 80A, 80B, 80C may comprise respective message queues 95A, 95b, 95C for being configured as a destination. In general, any client can exchange messages with any other client by using the message queues 95A, 95B, 95C to which one client sends and from which the other client receives.

While creating the message producer or message consumer, the client 75 specifies the destination message queue to which the client 75 requires to connect for sending messages or receiving messages. For example, according to one embodiment, names may be assigned to the message queues 95A, 95B, 95C and the destination message queue may be specified by specifying the name of the respective destination message queue. In another embodiment, unique identities may be assigned to the message queues 95A, 95B, 95C and the destination message queue may be specified by specifying the unique identity of the respective destination message queue. In the example of FIG. 4, the destination for message producer is message queue 95A and the destination for the message consumer is the message queue 95C. In general, the messaging components 80A, 80B, 80C comprise respective workload management components 100A, 100B, 100C. The workload management components 100A, 100B, 100C are configured to distribute the workload among the messaging components 80A, 80B, 80C connected to the bus 85. In general, the messaging environment 70 comprises a mechanism that enables the messaging components 80A, 80B, 80C to exchange information about their current state. The workload management components 100A, 100B, 100C are configured to use this mechanism for building and maintaining respective routing tables comprising information of current state of each of the message engines 80A, 80B, 80C. According to one embodiment of the present invention, the client 75 is configured to provide the identification information of the destination message queues 95A and 95C of the sessions 90A and 90B to the workload management component 100B of the messaging component 80B the client 75 is connected to. For example, the name of the destination message queues 95A and 95C may be provided to the workload management component 100B. By this, the workload management component 100B is provided with the identification information of the destination message queue for the sessions created by the client 75. The workload management component 100B is configured to identify the respective messaging components as to where the respective destination message queues are localized. For example, the workload management component 100B may identify the messaging component having the destination message queue localized using the routing tables.

In the shown example of FIG. 4, the destination message queue 95A is localized at the messaging component 80A and the destination message queue 95C is localized at the messaging component 80C. The workload management component 100B is configured to provide respective references of localization of the destination message queue 95A and 95B to the client 75. Thus, the client 75 is provided with the references as to on which messaging component the destination message queues 95A and 95C are localized. In general, the reference of localization of the destination message queue is the reference of the respective messaging component 80A, 80C having the respective destination message queue 95A, 95C localized. According to one embodiment of the present invention, the client 75 is configured to compare the connection reference of the connection 105 with the reference of the localization of the destination message queues 95A and 95B to determine if any of the message queues 95A and 95C are localized at the messaging component 80B, the client 75 is connected to. For references not matching with the connection reference of the connection 105, the client 75 is configured to initiate a connection to the messaging components referred to by the references. In the depicted example of FIG. 4, as the client 75 is connected to the messaging component 80B, the references and the connection reference do not match. Thus, the client 75 initiates connections to the messaging components 80A and 80C. The client 75 initiates connections to the messaging components directly responsive to the references. According to one embodiment of the present invention, the connection to the references not matching with the connection reference of the connection 105 is initiated as a proxy connection. This means that the connections to the messaging components 80A and 80C are proxy connections as depicted by the connections 110A and 110B. This enables the connections to be transparently routed to the messaging components 80A and 80C having the destination message queues 95A and 95C localized, by using the connection 105. Thus, the client 75 can create multiple message consumers and message producers using a single connection and dynamically route the messages to the respective messaging components where the destination message queue is localized.

Figure 5:
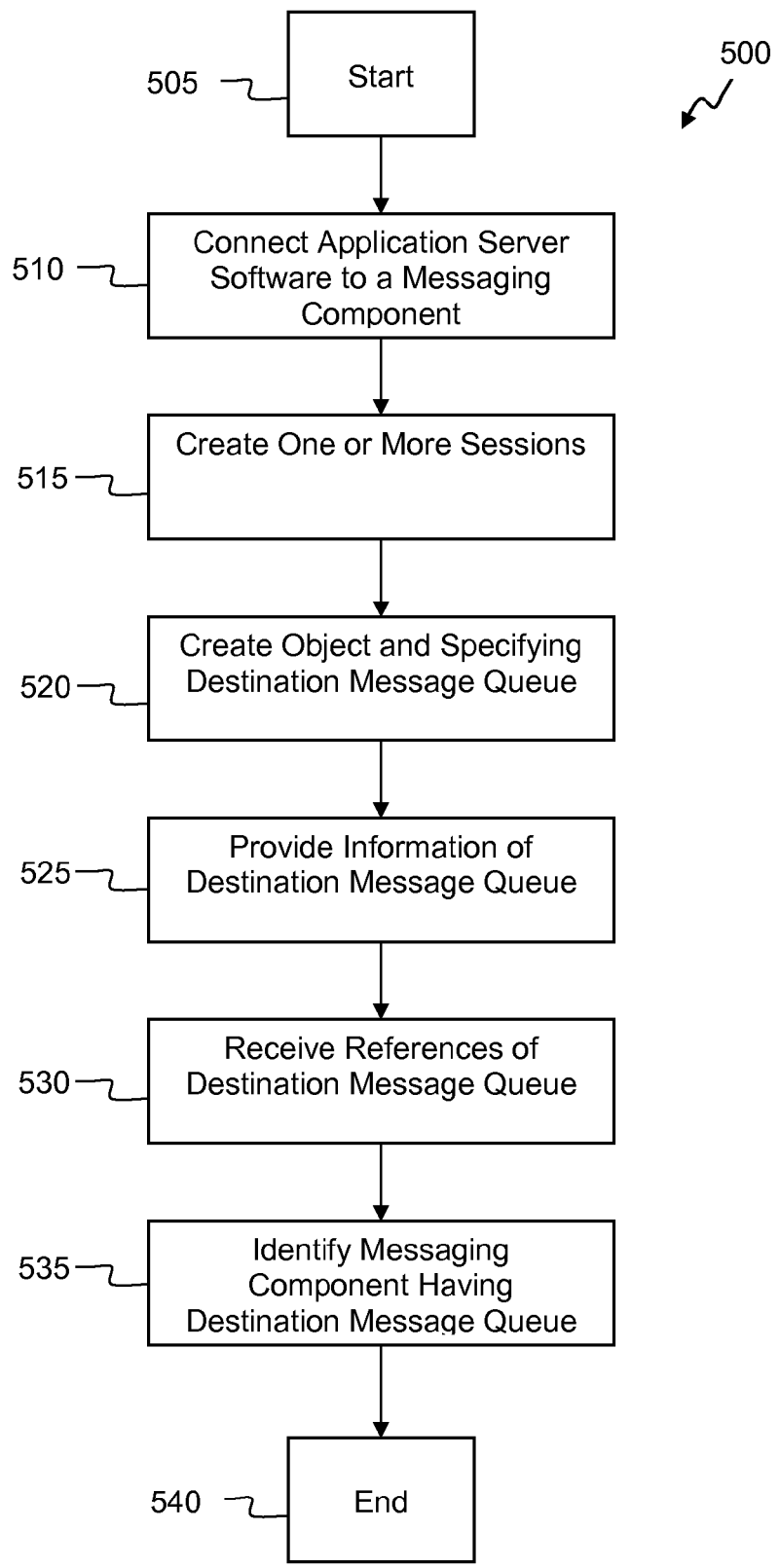
FIG. 5 shows an exemplary flow for performing aspects of the present invention.

FIG. 5 shows an exemplary flow for performing aspects of the present invention. The steps of FIG. 5 may be implemented in the environment of FIGS. 1-4, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-4. For the purposes of this description, a computer-usable or computer readable medium can be any non-transitory apparatus that can contain and store the program for use by or in connection with the instruction execution system, apparatus, or device. The medium can be an electronic, magnetic, optical, electro-magnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 5 depicts an exemplary flow for a process 500 in accordance with aspects of the present invention. In embodiments, the process 500 can be performed by the client 75 in FIG. 4.

At step 505, the process starts. At step 510, the client (e.g., the client 75 in FIG. 4) is connected to a messaging component (e.g., the messaging component 85B in FIG. 4) over a connection (e.g., the connection 105 in FIG. 4). At step 515, the client creates at least one session (e.g., the sessions 90A and 90B in FIG. 4) using the connection. At step 520, the client creates a message producer or a message consumer and specifies a destination message queue (e.g., the message queues 95A and 95B in FIG. 4) for the sessions created. At step 525, the client provides identification information of the destination message queues for the respective sessions to the messaging component, the client is connected to.

At step 530, the client receives references of the destination message queues from the messaging component. The messaging component provides the references of the destination message queues responsive to the identification information of the destination message queues provided by the client. According to one embodiment of the present invention, a workload management component 100B of the messaging component 85B provides the references of the destination message queues. At step 535, the client identifies the respective messaging components having the respective destination message queues localized based on the references. At step 540, the process ends.

As described herein, according to one embodiment of the present invention, there is provided a method implemented in a computer infrastructure for management of message connections, wherein the method comprises connecting a client to a messaging component over a connection. The method further comprises providing identification information of a destination message queue the client intends to communicate to the messaging component. The method further comprises receiving a reference of the destination message queue. The method further comprises identifying the respective messaging component having the destination message queue localized based on the reference.

According to another embodiment of the present invention, there is provided a system comprising a computer infrastructure operable to connect a client to a messaging component over a connection. The computer infrastructure is further operable to provide identification information of a destination message queue the client intends to communicate to the messaging component and receive a reference of the destination message queue. The computer infrastructure is further operable to identify the respective messaging component having the destination message queue localized based on the reference.

According to another embodiment of the present invention, there is provided a computer program product for identifying a messaging component having a destination message queue localized in a messaging environment, the computer program product comprising a computer readable storage medium having stored thereon first program instructions executable by a computer system to connect a client to a messaging component over a connection, second program instructions executable by the computer system to provide identification information of the destination message queue the client intends to communicate to the messaging component, third program instructions executable by the computer system to receive a reference of the destination message queue, and fourth program instructions executable by the computer system to identify the respective messaging component having the destination message queue localized based on the reference.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
   a hardware processor, a computer readable memory, and a non-transitory computer readable storage medium;
   first program instructions to connect a client to a first messaging component over a connection, wherein the first messaging component is implemented on a first computer;
   second program instructions to provide identification information of a destination message queue that the client intends to communicate to, wherein the destination message queue is used in a point to point messaging system, wherein the destination message queue is located on a second messaging component on a second computer, and wherein the second messaging component has been selected by a workload management component in the first messaging component in the first computer to store the destination message queue;
   third program instructions to receive a reference of the destination message queue, wherein the reference identifies the second messaging component upon which the destination message queue is located;
   fourth program instructions to identify, based on the reference, the second messaging component that has the destination message queue localized thereon; and
   fifth program instructions to, in response to determining that the destination message queue is not located in the first messaging component, use the reference to route the connection from the client to the second messaging component that has the destination message queue localized thereon, wherein a session connection between the client and the second messaging component that has the destination message queue localized thereon is transparently routed to the second messaging component by using the connection from the client to the first computer as a proxy connection to the second computer and the second messaging component; and wherein
   the first, second, third, fourth, and fifth program instructions are stored on the non-transitory computer readable storage medium for execution by the hardware processor via the computer readable memory.

2. The computer system of claim 1, further comprising:
   sixth program instructions to compare the reference of the destination message queue and a connection reference of the connection to determine if the destination message queue is localized at a messaging component to which the client is connected; and wherein
   the sixth program instructions are stored on the non-transitory computer readable storage medium for execution by the hardware processor via the computer readable memory.

3. The computer system of claim 1, further comprising:
   distributing, by workload management components on the first computer and the second computer, a communication session workload between the first messaging component and the second messaging component.

4. The computer system of claim 1, wherein the connection between the client and the first messaging component is via a Java Message Service Application Program Interface (JVS API), wherein the connection represents an open TCP/IP socket between the client and the first messaging component.

5. The computer system of claim 1, further comprising:
sixth program instructions to create at least one session using the connection;
seventh program instructions to create a message producer and a message consumer for a communication session;
eighth program instructions to specify the destination message queue for the communication session; and
ninth program instructions to provide the identification information of the destination message queue for the communication session to the messaging component to which the client is connected; and wherein
the fifth, sixth, seventh, and eighth program instructions are stored on the non-transitory computer readable storage medium for execution by the hardware processor via the computer readable memory.

6. The computer system of claim 1, wherein the reference is determined from a routing table comprising information about the first and second messaging components.

7. The system of claim 5, wherein a plurality of messaging components of the communication session are interconnected via a bus.

8. A computer program product for identifying a messaging component having a destination message queue localized in a messaging environment, the computer program product comprising a non-transitory computer readable storage medium having program code embodied therewith, the program code readable and executable by a processor to perform a method comprising:
connecting a client to a first messaging component over a connection, wherein the first messaging component is implemented on a first computer;
providing identification information of a destination message queue that the client intends to communicate to, wherein the destination message queue is used in a point to point messaging system, wherein the destination message queue is located on a second messaging component on a second computer, and wherein the second messaging component has been selected by a workload management component in the first messaging component in the first computer to store the destination message queue;
receiving a reference of the destination message queue, wherein the reference identifies the second messaging component upon which the destination message queue is located;
identifying, based on the reference, the second messaging component that has the destination message queue localized thereon; and
in response to determining that the destination message queue is not located in the first messaging component, using the reference to route the connection from the client to the second messaging component that has the destination message queue localized thereon, wherein a session connection between the client and the second messaging component that has the destination message queue localized thereon is transparently routed to the second messaging component by using the connection from the client to the first computer as a proxy connection to the second computer and the second messaging component.

9. The computer program product of claim 8, wherein said identifying, based on the reference, of the second messaging component that has the destination message queue localized comprises comparing the reference of the destination message queue and a connection reference of the connection to determine if the destination message queue is localized at a messaging component to which the client is connected.

10. The computer program product of claim 8, wherein the method further comprises:
distributing, by workload management components on the first computer and the second computer, a workload between the first messaging component and the second messaging component.

11. The computer program product of claim 10, wherein the connection between the client and the first messaging component is via a Java Message Service Application Program Interface (JVS API), wherein the connection represents an open TCP/IP socket between the client and the first messaging component.

12. The computer program product of claim 8, wherein the method further comprises:
creating at least one session using the connection;
creating a message producer and a message consumer for a communication session;
specifying the destination message queue for the communication session; and
providing the identification information of the destination message queue for the communication session to the messaging component to which the client is connected.

13. The computer program product of claim 8, wherein the reference is determined from a routing table comprising information about the first and second messaging components.

* * * * *